US006982954B2

(12) United States Patent
Dhong et al.

(10) Patent No.: US 6,982,954 B2
(45) Date of Patent: Jan. 3, 2006

(54) COMMUNICATIONS BUS WITH REDUNDANT SIGNAL PATHS AND METHOD FOR COMPENSATING FOR SIGNAL PATH ERRORS IN A COMMUNICATIONS BUS

(75) Inventors: Sang Hoo Dhong, Austin, TX (US); Harm Peter Hofstee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 09/848,175

(22) Filed: May 3, 2001

(65) Prior Publication Data

US 2002/0163881 A1 Nov. 7, 2002

(51) Int. Cl.
G01R 31/08 (2006.01)

(52) U.S. Cl. ............. 370/225; 370/217; 370/228; 370/248

(58) Field of Classification Search ........ 370/216–220, 370/228, 227, 364; 709/239; 327/545; 326/41; 714/724, 3; 324/765
See application file for complete search history.

(56) References Cited

U.S. PATENT DOCUMENTS 4,964,120 A * 10/1990 Mostashari ............... 370/228
4,970,724 A * 11/1990 Yung ...................... 714/3
4,982,114 A * 1/1991 Nakamura et al. ......... 326/41
4,985,830 A * 1/1991 Atac et al. ............... 709/239
6,185,706 B1 * 2/2001 Sugasawara .............. 714/724
6,188,271 B1 * 2/2001 Wang et al. .............. 327/545
6,476,630 B1 * 11/2002 Whitten et al. ........... 324/765

* cited by examiner

Primary Examiner—Bob Phunkulh
Assistant Examiner—Robert W. Wilson
(74) Attorney, Agent, or Firm—Casimer K. Salys; Russell D. Culbertson; The Culbertson Group, P.C.

(57) ABSTRACT

A communications bus (300) includes a number of alternate transmission paths (311, 312) between a given source node (301) and respective destination node (305) on a common substrate. The source node (301) receives a signal from a first circuit (309) serviced by the bus (300) while the respective destination node (305) transfers that signal to a second circuit (310) serviced by the bus. The communications bus (300) includes two switching arrangements for switching between the alternate transmission paths (311, 312). A source switching arrangement (318) is interposed between the source node (301) and the respective alternate transmission path (311, 312). This source switching arrangement (318) selectively connects the respective source node (301) to a selected one of the alternate transmission paths (311, 312) and disconnects the source node (301) from each other alternate transmission path. A destination switching arrangement (319) is interposed between the destination node (305) and respective alternate transmission paths (311, 312). The destination switching arrangement (319) selectively connects the respective destination node (305) to the selected alternate transmission path and disconnects the respective destination node from each other alternate transmission path.

22 Claims, 5 Drawing Sheets

COMMUNICATIONS BUS WITH REDUNDANT SIGNAL PATHS AND METHOD FOR COMPENSATING FOR SIGNAL PATH ERRORS IN A COMMUNICATIONS BUS

TECHNICAL FIELD OF THE INVENTION

This invention relates to communications buses for communicating electrical signals between two electronic circuits on a common chip or substrate. More particularly, the invention relates to a communications bus that is capable of allowing normal communications in spite of transmission path faults in the bus.

BACKGROUND OF THE INVENTION

Electronic systems may be made up of different circuits which must communicate with each other. The different circuits may be implemented on a single chip or may be implemented in different chips or packages each mounted on a common substrate. Whether the different circuits which must communicate with each other are implemented on a single chip or separate chips on a common substrate such as a printed circuit board, the physical connection which allows signals to be communicated between the circuits is commonly referred to as a communications bus or simply a "bus." Such a bus may include a single transmission path made of an electrically conductive material, or may include multiple electrically conductive transmission paths which allow multiple signals to be transmitted simultaneously between the circuits. The electrical signals may be transmitted in a single direction on a given transmission path or in both directions on a transmission path.

FIG. 1 shows a diagrammatic representation of two circuits 100 and 101 connected by three separate buses for communicating electrical signals between circuits. The bus shown in dashed box 102 provides unidirectional communications from circuit 100 to circuit 101. The bus shown in dashed box 103 provides unidirectional communications from circuit 101 to circuit 100. Dashed box 104 shows a bidirectional bus that allows electrical signals to be communicated from circuit 100 to circuit 101 and from circuit 101 to circuit 100. For purposes of this example, each bus includes four transmission paths, each transmission path indicated by reference numeral 105. It will be appreciated that the four transmission paths 105 in each bus are shown only for purposes of example and that a given communications bus may include fewer or many more transmission paths. It will also be appreciated that more than two circuits may be connected for communication across a common bus. For example, a microprocessor may have internal buses shared by several functional units.

As with all circuit elements, the transmission paths which are included in a communications bus may be subject to manufacturing defects or errors. For example, the electrically conductive material making up a transmission path may not be formed or deposited properly on a semiconductor substrate or printed circuit board leaving a gap or opening at some point along the conductive material. In such a case, the transmission path cannot carry the desired signals because it does not provide the required electrical continuity. Another type of error arises due to the common requirement that numerous transmission paths be located very close together, either on a semiconductor substrate or on a printed circuit board. Occasionally, the electrically conductive material making up two different transmission paths in a bus may touch, causing a short circuit between the two transmission paths. In this case, the shorted transmission paths cannot provide the intended transmission function in which both paths carry independent electrical signals. Also, a transmission path in a bus may inadvertently be formed so that it makes contact with a conductor carrying the system supply voltage or the system ground. In this type of bus error the affected transmission path is said to be "stuck" since the transmission path is held continuously at either the supply voltage level or ground.

SUMMARY OF THE INVENTION

It is an object of the invention to provide an internal or printed circuit board communications bus that has the capability of overcoming certain faults associated with the transmission paths included in the bus. It is also an object of the invention to provide a method for compensating for transmission path faults or errors in an internal or printed circuit board communications bus.

In order to accomplish these objects, a communications bus includes a number of alternate transmission paths between a given source node and respective destination node on a common substrate. The given source node receives a signal from a first circuit serviced by the bus while the respective destination node transfers that signal to a second circuit serviced by the bus. The communications bus according to the invention includes two switching arrangements for switching between the alternate transmission paths. A source switching arrangement is interposed between the source nodes and their respective alternate transmission paths. This source switching arrangement selectively connects the respective source node to a selected one of the alternate transmission paths and disconnects the source node from each other alternate transmission path. A destination switching arrangement is interposed between the destination nodes and their respective alternate transmission paths. The destination switching arrangement selectively connects the respective destination node to the selected alternate transmission path and disconnects the respective destination node from each other alternate transmission path.

By providing redundant or multiple alternate transmission paths between nodes, the present communications bus allows signals to be routed around defective transmission paths. For example, if one transmission path is improperly formed and represents an open circuit, communications may be switched to an alternate transmission path and the intended signals may then be communicated over this alternate transmission path. In the preferred form of the invention, the circuits connected to the bus cooperate to perform a test to locate faults in the various bus transmission paths. The test for transmission path faults may be performed a single time or periodically. One preferred form of the invention includes performing the transmission path test as a part of each system initialization. The test method includes applying a test signal to a given transmission path and determining if the test signal is properly received at the intended destination node. If the test signal is not properly received, the source and destination switching arrangements are switched so that signals from the particular source node to the particular destination node are communicated over an alternate transmission path between those two nodes. Preferably, the test includes testing all alternate transmission paths to locate any faults in the bus and then controlling the source and destination switching arrangement so that faulty transmission paths are bypassed.

A "communications bus" or "bus" as used in this disclosure and the accompanying claims refers to any physical transmission path arrangement between circuits in a system of cooperating circuits on a common substrate, printed circuit board or the like. The bus structure according to the invention may be used as an internal bus in a device such as a microprocessor, or may be used as an external bus formed on a printed circuit board for example. The invention is particularly helpful in large parallel buses used within an integrated circuit package since such buses are susceptible to manufacturing faults and defects. The term "common substrate" as used in this disclosure and the accompanying claims means either a common semiconductor or other circuit fabrication substrate, or a common printed circuit board, or both. For example, the conductors of a bus within the scope of the invention may extend across a semiconductor chip, off chip through appropriate connections, and then across a printed circuit board to another chip. Such a bus is to be considered on a common substrate.

The term "switching arrangement" as used in this disclosure and the accompanying claims encompasses any switching device or arrangement of devices for performing the desired switching between alternate transmission paths for a given source or destination node. In one form of the invention, the source switching arrangement includes a number of multiplexers which connect different source nodes to a single transmission path. Similarly a preferred destination switching arrangement includes a number of destination switching devices, each comprising a multiplexer connecting two or more bus transmission paths to a single destination node.

Each switching arrangement employed in the present invention also includes, or is associated with, a control structure for controlling the operation of the switching device or devices included in the switching arrangement. One preferred control structure comprises a memory device which provides the appropriate signals to the various switching devices or device making up the particular switching arrangement. The memory device may be volatile or non-volatile memory.

The invention is applicable to both unidirectional buses and bidirectional buses. In the case of a bidirectional bus according to the invention, the bus will include a receive switching arrangement and first control switching arrangement in addition to the source switching arrangement. Similarly, the destination switching arrangement in a bidirectional bus implementation will be accompanied by a send switching arrangement and a second control switching arrangement. The control switching arrangements are required to control the communication direction in each transmission path, while the send and receive switching arrangements are required to control the additional signals being communicated across each transmission path.

One preferred form of the invention separates source nodes and their respective destination nodes into different subsets, each having a separate group of alternate transmission paths. In this form of the invention the alternate transmission paths for the different subsets are interleaved together so that each transmission path in the bus is adjacent to transmission paths associated with a different subset. This interleaving of alternate transmission paths allows the bus structure to compensate not only for open circuit or stuck transmission paths, but also for short-circuited adjacent transmission paths.

These and other objects, advantages, and features of the invention will be apparent from the following description of the preferred embodiments, considered along with the accompanying drawings.

DESCRIPTION OF THE PREFERRED EMBODIMENTS

Figure 1:
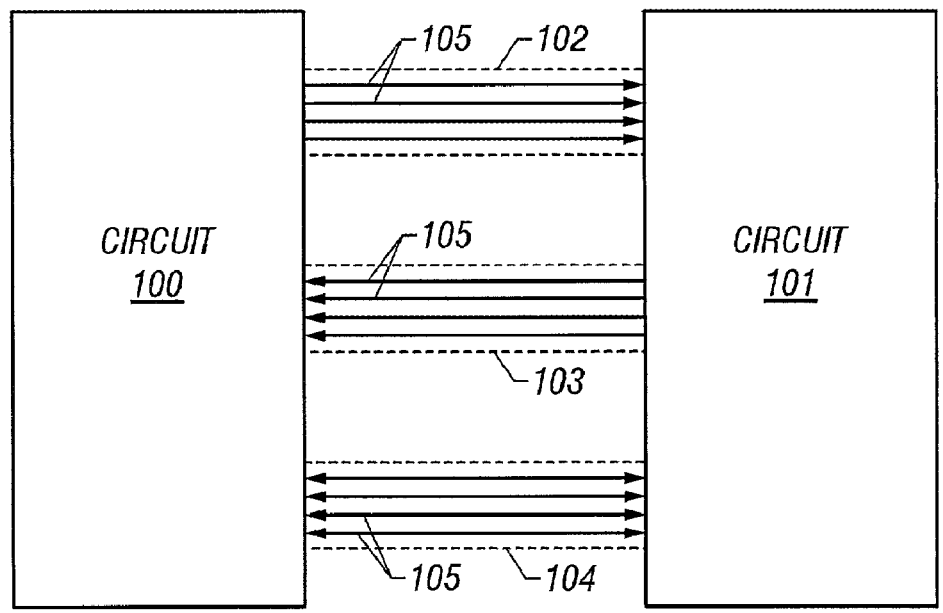
FIG. 1 is a diagrammatic representation of a prior art communications bus arrangement between two circuits.
Figure 2:
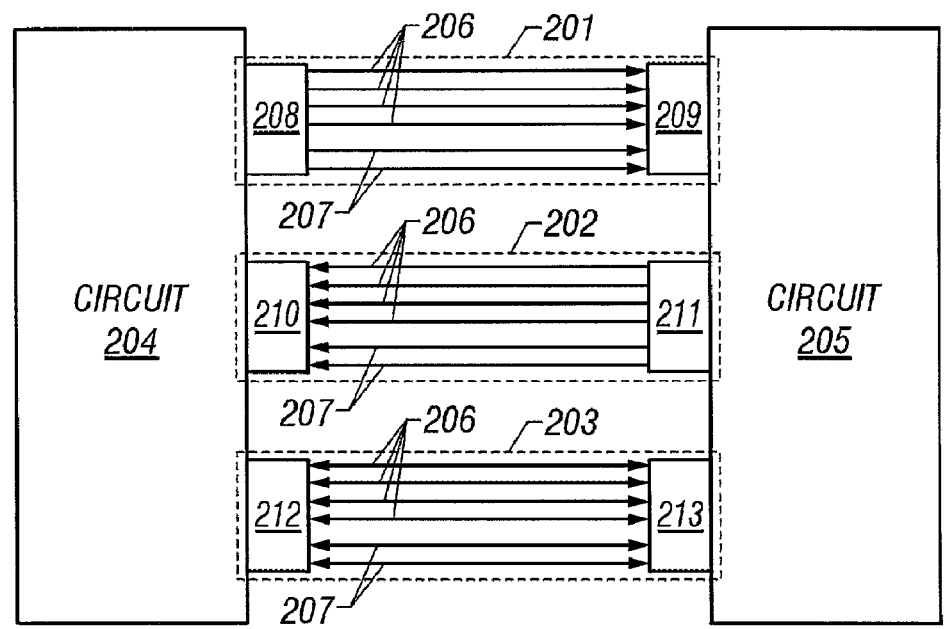
FIG. 2 is a diagrammatic representation of communications bus arrangement embodying the principles of the invention.

FIG. 2 shows a high-level diagrammatic representation of several different communications buses embodying the principles of the invention. In particular, FIG. 2 includes a first unidirectional bus 201, a second unidirectional bus 202, and a bidirectional bus 203. A comparison of the prior art bus arrangements shown in FIG. 1 with the bus arrangements shown in FIG. 2 will highlight the unique features of the present invention. As in FIG. 1, each bus in FIG. 2 connects two circuits for communicating with each other. These two circuits are labeled 204 and 205 in FIG. 2. Also, as in the prior art arrangement shown in FIG. 1, each bus 201, 202, and 203 in FIG. 2 includes four different transmission paths 206 connecting respective nodes of the two circuits. However, each bus in FIG. 2 includes additional or redundant transmission paths. These extra transmission paths shown diagrammatically at 207 in FIG. 2. Each bus according to the invention shown in FIG. 2 also includes switching arrangements which are not required in the traditional bus arrangement shown in FIG. 1. Switching arrangements 208 and 209 are associated with bus 201, switching arrangements 210 and 211 are associated with bus 202, and switching arrangements 212 and 213 are associated with bidirectional bus 203.

The additional or redundant signal transmission paths and switching arrangements included in a bus according to the present invention allow the bus to compensate for faults in the bus transmission paths. The example buses described below with reference to FIGS. 3 and 5 may correct for an open or stuck transmission path. A form of the invention having interleaved transmission paths described below with reference to FIG. 4 is capable of compensating not only for an open or stuck transmission path, but also for short circuits between adjacent transmission paths.

Figure 3:
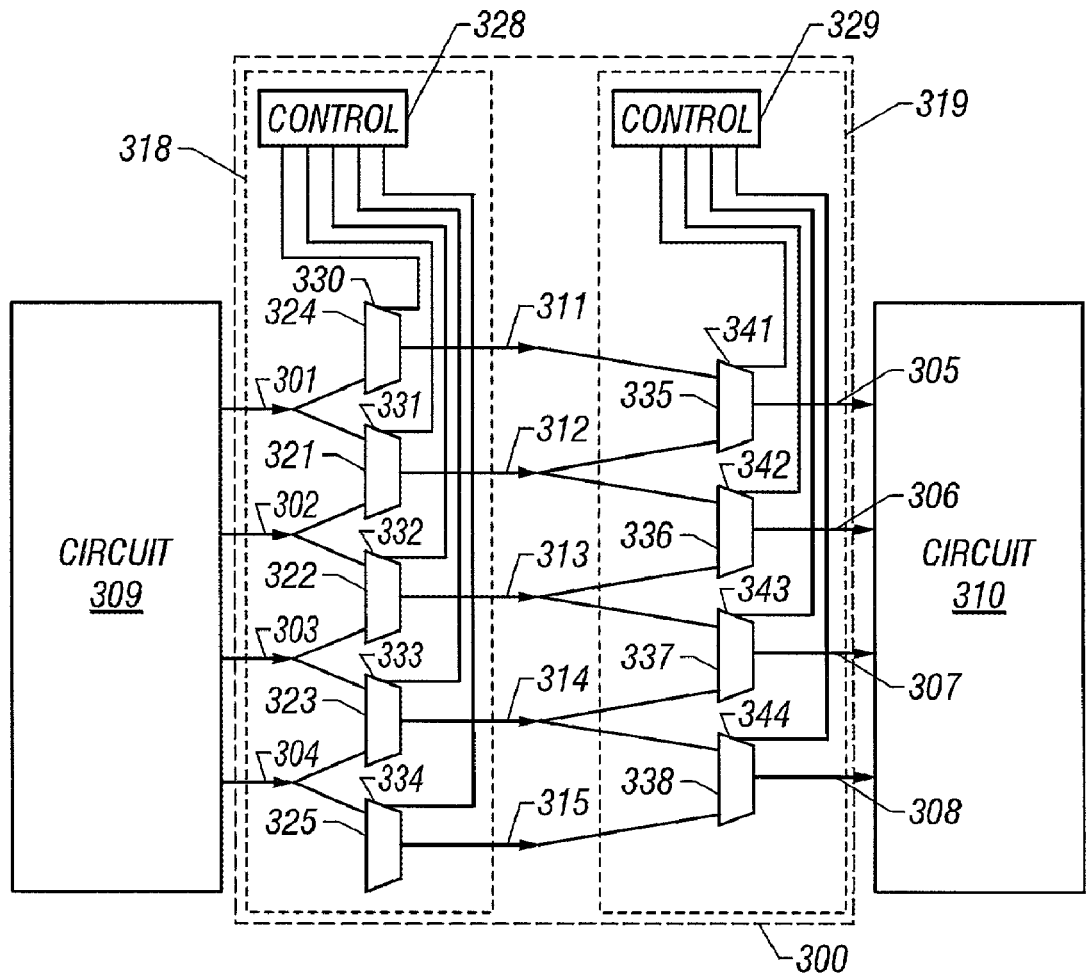
FIG. 3 is an electrical schematic diagram showing one embodiment of a communications bus embodying the principles of the invention.
Figure 4:
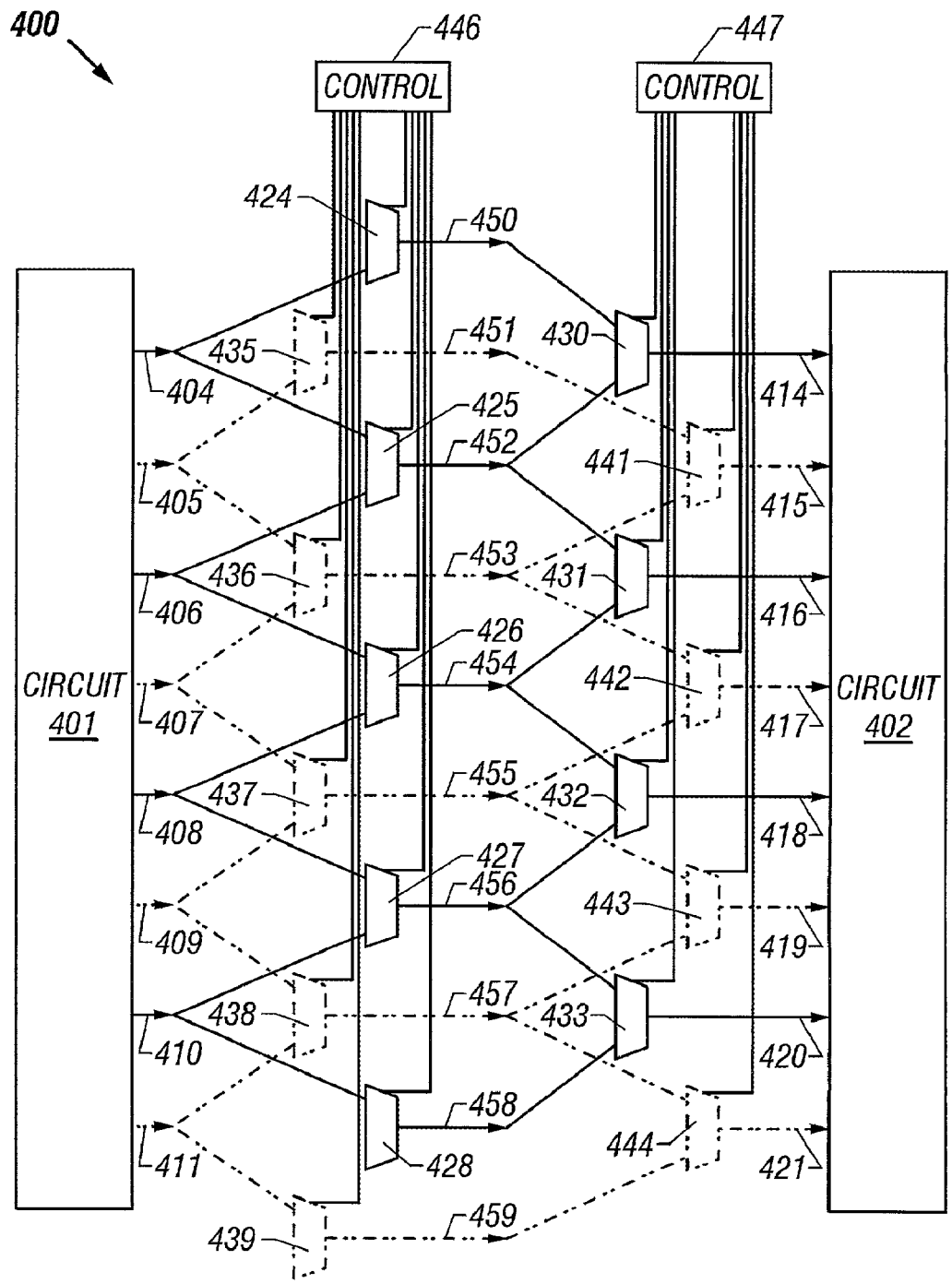
FIG. 4 is an electrical schematic diagram showing an alternate communications bus embodying the principles of the invention.

FIG. 3 shows an electrical schematic of a unidirectional bus 300 embodying the principles of invention. The bus includes four source nodes 301 through 304 and four destination nodes 305 through 308. Source nodes 301 through 304 are connected to nodes of circuit 309 which must communicate signals to four corresponding nodes of circuit 310. It will be appreciated that the invention is not limited to situations in which four nodes associated with one circuit must communicate with four corresponding nodes of another circuit. The invention may be employed to facilitate communications between more or fewer circuit nodes. Also, the principles of the invention may be applied to buses which connect more than two circuits. The simple two-circuit embodiment shown in FIG. 3 is shown only for purposes of example.

Bus 300 includes five separate transmission paths 311 through 315. It will be noted that the number of bus transmission paths is greater than the number of source nodes in the bus. The additional transmission paths represent redundant paths used to ensure that alternate transmission paths extend between each source node 301 through 304 and a respective destination node 305 through 308. Bus 300 also includes a source switching arrangement 318 interposed between transmission paths 311 through 315 and source nodes 301 through 304, and a destination switching arrangement 319 interposed between the transmission paths and destination nodes 305 through 308. These switching arrangements 318 and 319 function to switch between alternate transmission paths as necessary to avoid transmission path faults.

Source switching arrangement 318 includes a number of the different switching devices, in this case a different switching device for each transmission path 311 through 315. Switching devices 321, 322, and 323 each comprise a two input multiplexer (MUX), while switching devices 324 and 325 on the ends of bus 300 each comprise a pass gate. The inputs to MUX 321 are connected to source nodes 301 and 302 and the output of MUX 321 is connected to transmission path 312. The inputs to MUX 322 are connected to nodes 302 and 303 and the MUX output is directed to transmission path 313. MUX 323 has its inputs connected to source nodes 303 and 304 and its output connected to transmission path 314. Pass gate 324 receives its input from source node 301 and directs its output to transmission path 311. Pass gate 325 receives its input from source node 304 and directs its output to transmission path 315.

Source switching arrangement 318 also includes a source switch control structure including the control device 328. Control device 328 is connected to provide a control signal to each switching device in the source switching arrangement. In particular, control device 328 provides a control signal at control input 330 of pass gate 324, control input 331 of MUX 321, a control input 332 of MUX 322, control input 333 of MUX 323, and control input 334 of pass gate 325. In the preferred form of the invention control device 328 comprises a suitable memory device for applying the desired signals to the respective control inputs. For example, control device 328 may comprise an array of memory cells or latches, each providing the signal for one of the control inputs in the switching arrangement 318. A series of fuses or other nonvolatile memory arrangement may also be used to provide the control signals for the various switching devices of source switching arrangement 318. In the fuse arrangement, the condition of each fuse is changed to change the state of a control signal. Each fuse may be blown or broken only once to effect a control signal change, and thus a control arrangement made up of a series of fuses may generally be configured only once. It is preferable, however, to use a resettable or rewritable memory arrangement to allow the bus according to the invention to be reconfigured as desired. Also, the use of rewritable memory for the control device 328 facilitates automated bus configuration and reconfiguration which will be discussed below with reference to FIG. 6.

Destination switching arrangement 319 includes a number of different switching devices 335 through 338, in this case a different switching device for each destination node 305 through 308. Each destination node switching device includes a two input/single output MUX. MUX 335 receives inputs from transmission paths 311 and 312, and has its output connected to destination node 305. MUX 336 receives inputs from transmission paths 312 and 313 and has its output connected to destination node 306. MUX 337 receives inputs from transmission paths 313 and 314 and has its output connected to destination node 307. Finally, MUX 338 receives inputs from transmission paths 314 and 315 and has its output connected to destination node 308.

Destination switching arrangement 319 also includes a control structure including control device 329. This control device device 329 is similar to device 328 and comprises a structure for providing control signals for switching devices 335 through 338 included in destination switching arrangement 319. In particular, control device device 329 provides a control signal at control input 341 of MUX 335, at control input 342 of MUX 336, at control input 343 of MUX 337, and at control input 344 of MUX 338. As with the source control structure, the destination control device device 329 may include any suitable device for providing the desired control signals, including a series of memory cells, latches, fuses, or other memory arrangement.

The operation of the invention may now be described with reference to FIG. 3. Assume for example that transmission path 312 includes a manufacturing defect which produces an electrical discontinuity at some point along the length of the transmission path. Thus, transmission path 312 would represent an open circuit. This transmission path fault may be detected according to the invention by cooperation between circuits 309 and 310 and the source and destination switching arrangements 318 and 319, respectively. In particular, the fault may be detected by applying a signal over path 312 and determining if the transmitted signal is properly received at Circuit 310. Since the transmission path represents an open circuit, a test signal transmitted from circuit 309 across path 312 will not be received at circuit 310, and this absence of the signal at circuit 310 indicates that path 312 is faulty. To compensate for this faulty transmission path 312, the source and destination switching arrangements, 318 and 319 respectively, will operate to ensure that source nodes 301 through 304 and destination nodes 305 through 308 are connected without using path 312. In this example, source node 301 will be connected to destination node 305 through transmission path 311, and source node 302 will be connected to destination node 306 through transmission path 313. Also, source node 303 will be connected to destination node 307 through transmission path 314 and source node 304 will be connected to destination node 308 through transmission path 315.

To effect these connections between source and destination nodes the source and destination switching devices must be controlled properly through the respective control device. In particular, pass gate 324 will be controlled to pass signals from source node 301 to path 311 and destination MUX 335 will be controlled to pass signals from path 311 to destination node 305. In this embodiment binary signals may be used to control the switching devices. For example and logical "1" at control input 330 for pass gate 324 may allow signals to pass while a logical "0" may cause the pass gate to block signals. Similarly, a logical "1" at control input 341 for MUX 335 may cause the MUX to pass only signals from path 311 to destination node 305 while a logical "0" at control input 341 may cause the MUX to pass only signals from transmission path 312 to destination node 305. Thus, in this example the control signals to pass gate 324 and MUX 335 will be "1" and "1."

Continuing with the example in which transmission path 312 is determined to be an open circuit, source MUX 322 will be controlled to pass signals from source node 302 to transmission path 313, and destination MUX 336 will be controlled to pass signals from path 313 to destination node 306. Source MUX 323 will be controlled to pass signals from source node 303 to transmission path 314, and destination MUX 337 will be controlled to pass signals from path 314 to destination node 307. Finally, pass gate 325 will be activated to pass signals from source node 304 to transmission path 315, and destination MUX 338 will be controlled to pass signals from path 315 to destination node 308.

It will be noted that the state of source MUX 321 may be irrelevant since the transmission path associated with that MUX, transmission path 312, represents an open circuit. However, even an open circuit at transmission path 312 may represent a sufficient capacitance to interfere with the propagation of signals over the adjacent transmission paths. It is therefore desirable that the source MUXs, including MUX 321 be capable of decoupling both MUX inputs from the MUX output. This MUX control also allows the present bus to compensate for errors such as a stuck transmission path or, as will be discussed below with reference to FIG. 4, shorted transmission paths. In the case where a MUX in the switching arrangements is capable of decoupling each input from the MUX output, the MUX may require multiple control inputs and multiple control lines to provide those control inputs. In any event, and referring back to the example of an error on transmission path 312, MUXs 335 and 336 in the destination switching arrangement 319 are controlled so that the state or signal appearing on transmission path 312 is not communicated to either destination node 305 or destination node 306.

It will also be noted that pass gates 324 and 325 appearing at the ends or outermost transmission paths of bus 300 may be replaced with other switching devices. It is necessary to have some switching device between the outermost transmission paths and the respective outermost source nodes (e.g. path 315 and node 304) in order to isolate the respective node from the state of the path. For example, if transmission path 315 in FIG. 3 is stuck high, a switching device such as pass gate 325 is necessary to isolate node 304 from the high voltage level appearing on transmission path 315.

The form of the invention illustrated in FIG. 3 connects each source node to two different switching devices to provide two alternate transmission paths for signals from those nodes. Adjacent source nodes share one alternate transmission path, resulting overall in only a single extra transmission path in the bus. However, the invention is not limited to this level of switching or transmission path redundancy. Additional switching and additional transmission paths may be included to facilitate additional alternate transmission paths for each source node.

FIG. 4 shows an alternate bus 400 within the scope of the present invention. Bus 400 is connected between a circuit 401 which must communicate signals to a second circuit 402. In particular, circuit 401 must communicate signals from eight separate nodes or output pins to eight separate nodes or input pins associated with circuit 402. Thus, bus 400 includes eight source nodes 404 through 411 and eight respective destination nodes 414 through 421. In this form of the invention, the source and destination nodes are separated into two different subsets, one subsets includes source nodes 404, 406, 408, and 410 and destination nodes 414, 416, 418, and 420, while the other subset includes source nodes 405, 407, 409, and 411 and destination nodes 415, 417, 419, and 421. Source nodes 405, 407, 409, and 411, along with all other connections, nodes, and devices associated with that subset of source nodes are shown in phantom lines in FIG. 4 to help distinguish the two subsets.

Each subset of source and destination nodes includes a separate source and destination switching arrangement. The source switching arrangement for the first subset includes source switching devices 424, 425, 426, 427, and 428, and destination switching arrangement includes switching devices 430, 431, 432, and 433. The source switching arrangement for the second subset includes source switching devices 435, 436, 437, 438, 439, and the destination switching arrangement includes switching devices 441, 442, 443, and 444. Within each subset the connection between the switching devices, transmission paths, and source and destination nodes is identical to that set out in FIG. 3. Thus, details of the structure and operation will not be repeated here with reference to FIG. 4. It will be noted that the two subsets of source switching devices are controlled by a single control device 446 and the destination switching devices are also controlled by a single control device 447. These control devices 446 and 447 control the various switching devices to which they are connected to effect the desired switching between alternate transmission paths as discussed with reference to the control devices 328 and 329 shown in FIG. 3.

According to this alternate form of the invention, the transmission paths associated with each subset of source and destination nodes are interleaved with the transmission paths associated with the other subset of nodes. That is, transmission paths 450, 452, 454, 456, and 458 associated with one subset of nodes are interleaved with transmission paths 451, 453, 455, and 457 associated with the other subset of nodes. Thus, each transmission path in FIG. 4 is adjacent only to a transmission path associated with another subset of nodes. This interleaving a transmission paths allows the bus 400 shown in FIG. 4 to compensate both for open or stuck transmission paths and also for short circuits between adjacent paths. This bus structure is particularly helpful in very large buses in which the transmission paths are very closely spaced, making shorts between adjacent paths more likely.

For example, assumed that transmission path 457 and transmission path 458 are shorted together. In this case, the signal from source nodes 409 and 411 and/or signals from node 410 must be directed around the respective transmission paths, 457 and 458. In one configuration, the signal from node 411 will be transmitted to destination node 421 across transmission path 459 and the signal from source node 409 will be directed over transmission path 455 ultimately to destination node 419. Signals from source node 410 will be directed over transmission path 456 and ultimately to destination node 420. Alternatively, in this short circuit situation, it may be possible to continue using one of the shorted transmission paths depending upon how the fault effects signal propagation over the path. Of course it would be desirable to be able to continue using one of the shorted transmission paths so that the remaining transmission paths may be available to compensate for other faults.

Figure 5:
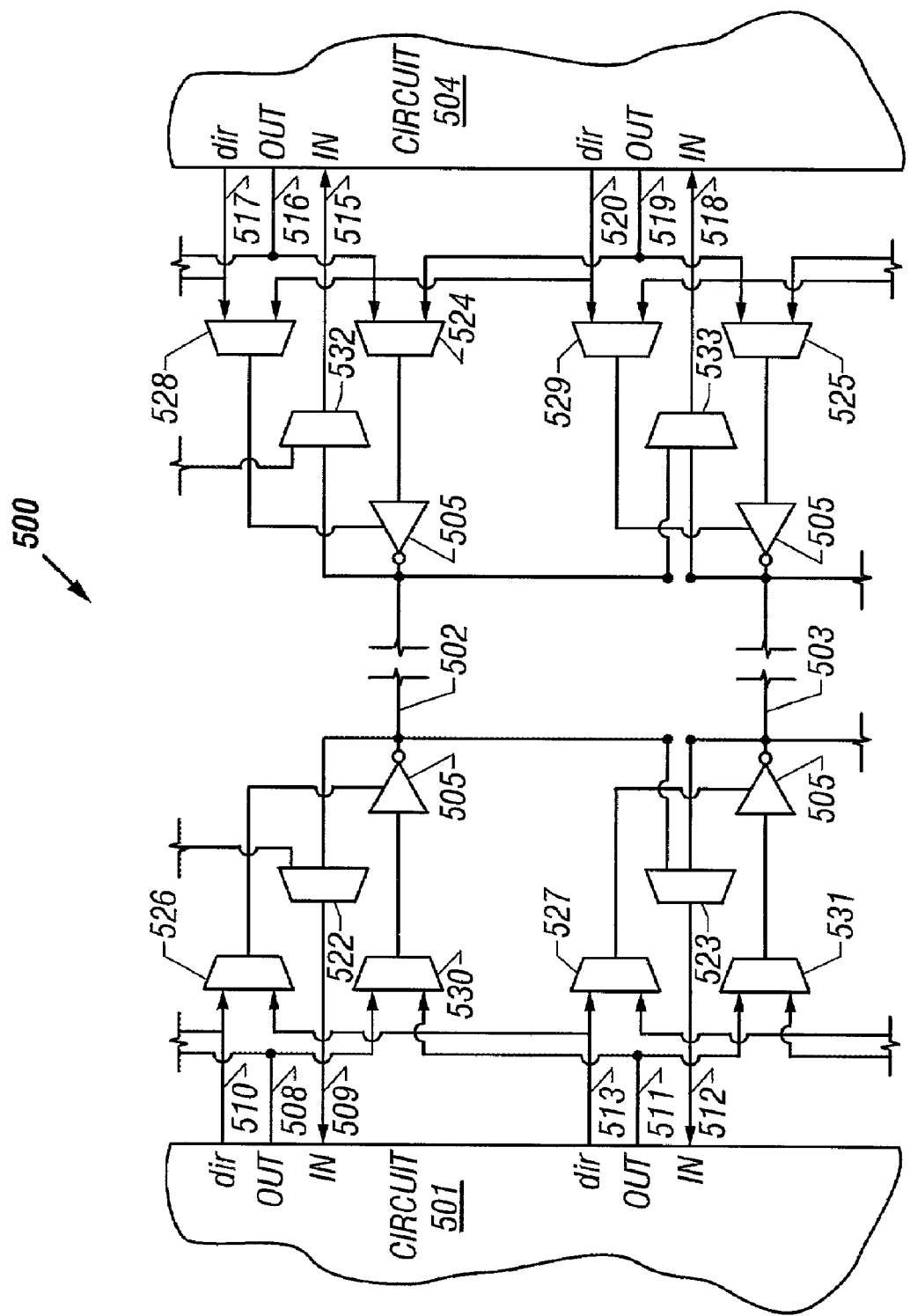
FIG. 5 is an electrical schematic diagram of a portion of a bidirectional bus embodying the principles of the present invention.

FIG. 5 shows a portion of a bidirectional bus 500 embodying the principles of the invention. In this bidirectional bus 500, signals may be transmitted from circuit 501 across bidirectional transmission paths 502 and 503 to circuit 504. Also signals may be communicated from circuit 504 across the same transmission paths 502 and 503 to circuit 501. As is known in the art, each bidirectional transmission path 502 and 503 includes a tri-state driver 505 at each end of the transmission path. The tri-state drivers 505 control whether signals are transmitted or received at each end of the respective transmission path.

Additional nodes are also included in bidirectional bus 500. A receive node and first direction control node are associate with each source node. In FIG. 5, source node 508 (OUT) is associated with receive node 509 (IN) and first direction control node 510 (dir), whereas source node 511 (OUT) is associated with receive node 512 (IN) and first direction control node 513 (dir). Similarly, a send node and second direction control node are associate with each destination node. Again in FIG. 5, destination node 515 (IN) is associated with send node 516 (OUT) and second direction control node 517 (dir), and destination node 518 (IN) is associated with send node 519 (OUT) and second direction control node 520 (dir).

Additional switching arrangements are required in bidirectional bus 500 in order to accommodate the bidirectional capability. In particular, a receive switching arrangement (including MUXs 522 and 523) is interposed between the receive nodes and the bidirectional transmission paths, and a send switching arrangement (including MUXs 524 and 525) is interposed between the send nodes and bidirectional transmission paths. Also, a first direction control switching arrangement (including MUXs 526 and 527) is interposed between the first direction control nodes and the tri-state drivers at one end of the transmission paths, and a second direction control switching arrangement (including MUXs 528 and 529) is interposed between the second direction control nodes and the tri-state drivers at the other end of the transmission paths. These switching arrangements are in addition to the source switching arrangement including MUXs 530 and 531 in FIG. 5, and destination MUXs 532 and 533. The various switching devices may be thought of as groups each associated with a given transmission path. For example, source MUX 530, receive MUX 522, and first direction control MUX 526 form one group associated with transmission path 502.

As with the embodiments shown in FIGS. 3 and 4, the various nodes are each associated with alternate transmission paths. For example, source node 511 may direct signals over transmission path 503 or 502 depending upon the state of MUXs 530 and 531. As another example, receive node 509 may receive signals from either transmission path 502 or the next adjacent transmission path above path 502 (not shown in FIG. 5) depending upon the state of MUXs 522 and 523.

It will be appreciated that FIG. 5 shows only two transmission paths 502 and 503, and the associated switching devices associated with two ends of each path. The adjacent paths above path 502 and below path 503 are not shown in FIG. 5 so as not to obscure the invention in unnecessary detail. However, it will be appreciated that each path includes circuitry similar to that shown for paths 502 and 503. Also, it should be noted that the control lines and control device for controlling the various switching devices (in this case MUXs) are omitted from FIG. 5 so as to simplify the drawings. It will be appreciated that each switching device must include a control input and receive a control signal or signals from a suitable control device such as device 328 in FIG. 3.

Referring now to the operation of the embodiment shown FIG. 5, assume that bidirectional transmission path 502 includes a defect causing it to represent an open circuit. In this situation signals from source node 511 are routed through MUX 531 to transmission path 503. Also signals from send node 519 are routed through send MUX 525 through transmission path 503. The signals sent from source node 511 are received through destination MUX 533 to destination node 518, and signals sent from send node 519 are received at received node 512 through received MUX 523. Direction control for tri-state driver 505 on the left end of path 503 in FIG. 5 is provided from first direction control node 513 through first direction control MUX 527, while direction control for tri-state driver 505 at the right end of path 503 is provided from second direction control node 520 through second direction control MUX 529. In this example, communications between the source node 508 and destination node 515, and between send node 516 and received node 509 are handled through a transmission path immediately adjacent to transmission path 502 (that is the next path above path 502 in the complete circuit not shown in FIG. 5 in order to simplify the drawing).

The method of the invention may now be described with reference to the flow chart of FIG. 6 and to the embodiment of the invention shown in FIG. 3. It will be appreciated that the method could be described with reference to either FIGS. 4 or 5 rather than FIG. 3. However, FIG. 3 is selected for purposes of description since it provides a relatively more simple example. The method includes applying a test signal to a first alternate transmission path as shown at process block 601 in FIG. 6. Referring to FIG. 3, this test signal may be applied for example from source node 302 across transmission path 312 to destination node 306. In this example, MUX 321 and MUX 336 must be controlled properly to pass the signal from node 302 and 312 respectively. The method also includes monitoring for the test signal as shown that process block 602 in FIG. 6 in order to determine whether the test signal is properly received at the desired node. If the test signal is properly received as indicated at decision block 603, the transmission path which carried the signal is not open or stuck and may be used to carry signals as shown at process block 604. However, if the test signal is not properly received at the desired node, the invention includes switching to an alternate transmission path as shown at process block 605 in FIG. 6 if an alternate path is available as indicated at decision block 606. Referring again to FIG. 3, the switch would be from path 312 to path 313 which is available to source node 302 through MUX 322. The signal is carried to destination node 306 again through MUX 336 which is simply switched to listen to transmission path 313 rather than 312. The test may be conducted again with regard to that alternate transmission path to determine if that path is operable. If that alternate transmission path is also faulty, the invention may include testing another alternate transmission path if such a path is available. If no further alternate transmission path is available, the system may produce a suitable error message.

Figure 6:
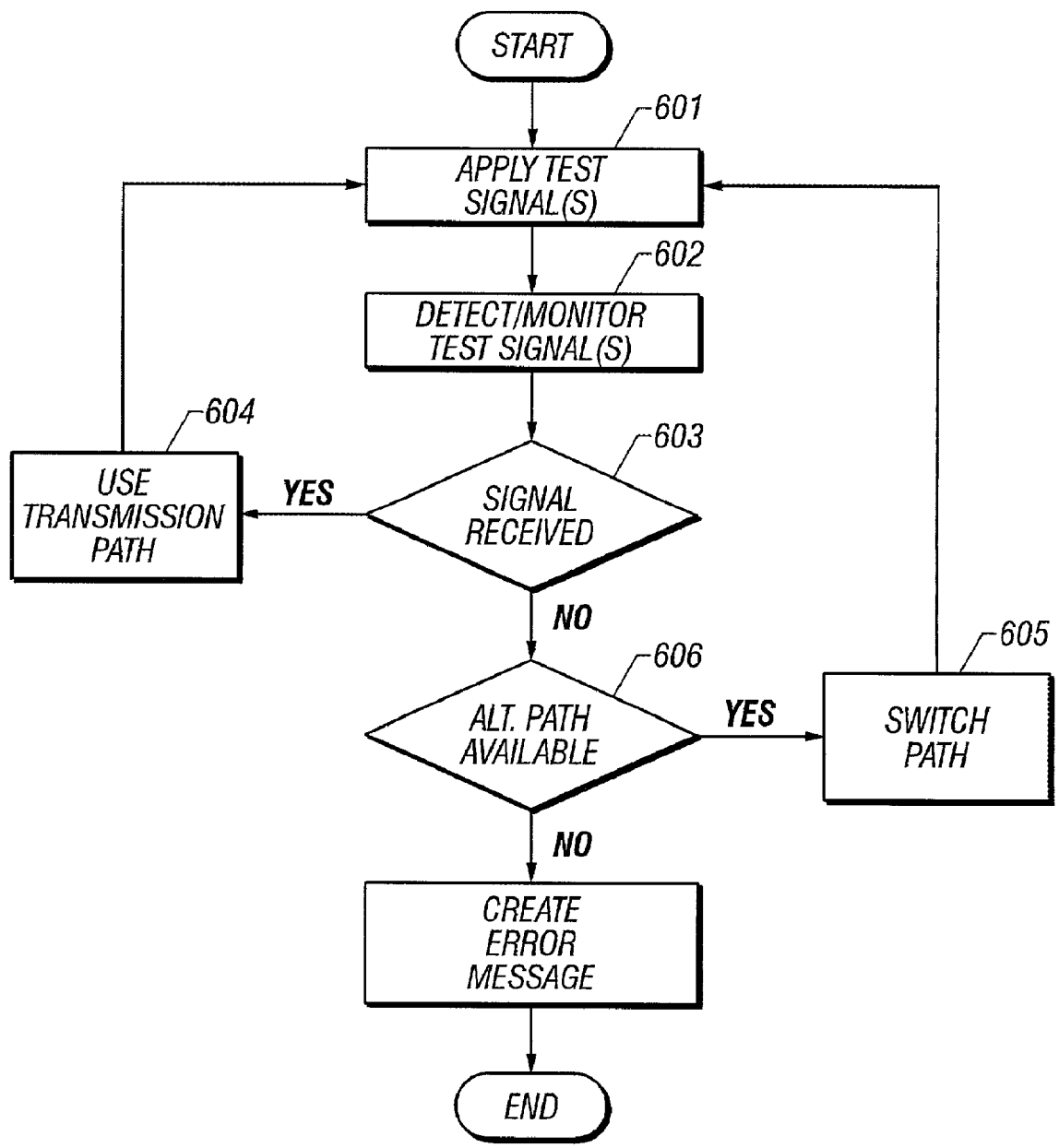
FIG. 6 is a flow chart showing the process steps according to the present invention.

It will be appreciated that the transmission path testing method described in FIG. 6 is dependent upon not only the bus according to the invention, but also upon the circuits using the bus. In the example of FIG. 3, circuits 309 and 310 cooperate with bus 300 to test the transmission paths in order to configure the bus to avoid faults. In particular, circuit 309 must generate the test signal and circuit 310 must listen for the test signal at the appropriate destination node, while the source and destination switching arrangements 318 and 319 control the required source and destination switching devices. Alternatively, a specialized test circuit may be connected to the source and destination nodes to provide the required testing functions. This specialized circuitry would be in addition to the circuits connected for communications over the bus.

In the preferred form of the invention, each alternate transmission path is tested to locate faults in the bus. This test procedure may be done once for a particular bus or periodically such as at each system initialization or startup.

Based upon the faults detected in the transmission paths, the switching arrangements associated with the bus are controlled to switch signals around the faulty transmission paths assuming sufficient operable paths are available. Of course, there are a limited number of errors that can be corrected. For example, in the embodiment of the invention shown in FIG. 3, only one open or stuck transmission path may be compensated for, and still provide normal communications between the two circuits 309 and 310. However, as indicated above, the invention may include even more additional alternate transmission paths and more complex switching arrangements to allow for the correction of additional transmission path errors.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A communications bus connected between a source node and a destination node, the communications bus including:
    (a) a number of alternate transmission paths extending between the source node and the destination node on a common substrate comprising a semiconductor chip;
    (b) a source switching arrangement interposed between the source node and the alternate transmission paths, the source switching arrangement being operable to selectively connect the source node to a selected one of the alternate transmission paths and disconnect the source node from each other alternate transmission path;
    (c) a destination switching arrangement interposed between the destination node and the alternate transmission paths, the destination switching arrangement being operable to selectively connect the destination node to the selected one of the alternate transmission paths and disconnect the destination node from each other alternate transmission path; and
    (d) test circuitry connected to the source node and the destination node for applying a test signal to the selected one of the alternate transmission paths and for monitoring the destination node to determine whether the test signal is properly received at the destination node, wherein when the test signal is not properly received at the destination node the source switching arrangement disconnects the source node from the selected one of the alternate transmission paths and connects the source node to a respective one of the other alternate transmission paths, and the destination switching arrangement disconnects the destination node from the selected one of the alternate transmission paths and connects the destination node to the respective one of the other alternate transmission paths.

2. The communications bus of claim 1 wherein:
    (a) the source switching arrangement includes multiple source switching devices, a different source switching device connected between the source node and each alternate transmission path; and
    (b) the destination switching arrangement includes at least one destination switching device connected between the destination node and each alternate transmission path.

3. The communications bus of claim 2 wherein:
    (a) the different source switching devices include at least one multiplexer; and
    (b) the at least one destination switching device comprises a multiplexer.

4. The communications bus of claim 1 further including:
    (a) a source switch control structure for controlling the operation of the source switching arrangement; and
    (b) a destination switch control structure for controlling the operation of the destination switching arrangement.

5. The communications bus of claim 4 wherein the source switch control structure and the destination switch control structure each includes a nonvolatile or volatile memory structure.

6. The communications bus of claim 1 wherein:
    (a) a receive node and first direction control node are associated with the source node, and a send node and second direction control node are associated with the destination node;
    (b) a send switching arrangement is interposed between the send node and each alternate transmission path;
    (c) a receive switching arrangement is interposed between each alternate transmission path and the receive node;
    (d) a first direction control switching arrangement is interposed between the first direction control node and a control input of a tri-state driver associated with the source node; and
    (e) a second direction control switching arrangement is interposed between the second direction control node and a control input of a tri-state driver associated with the send node.

7. The communications bus of claim 1 wherein:
    (a) the communications bus is also connected between a number of additional source nodes and the same number of additional destination nodes;
    (b) a number of additional alternate transmission paths extend between each additional source node and each additional destination node;
    (c) the source switching arrangement is also interposed between each additional source node and the respective alternate transmission paths associated with that respective additional source node, the source switching arrangement also being operable to selectively connect each respective additional source node to a selected one of the additional alternate transmission paths associated with that source node and disconnect each respective additional source node from each other additional alternate transmission path associated with that additional source node; and
    (c) the destination switching arrangement is also interposed between each additional destination node and the respective alternate transmission paths associated with that additional destination node, the destination switching arrangement also being operable to selectively connect each respective additional destination node to the selected one of the alternate transmission paths associated with that additional destination node and disconnect the respective additional destination node from each other additional alternate transmission path associated with that additional destination node.

8. The communications bus of claim 7 wherein the source switching arrangement comprises a number of multiplexers.

9. The communications bus of claim 8 wherein the source node and number of additional source nodes are arranged side-by-side and wherein at least one pair of adjacent source nodes in this side-by side arrangement share a common multiplexer included in the number of multiplexers.

10. The communications bus of claim 7 wherein:
(a) the source switching arrangement includes a first switching subset connected to a first subset of the alternate transmission paths;
(b) the source switching arrangement further includes a second switching subset connected to a second subset of the alternate transmission paths; and
(c) the alternate transmission paths making up the second subset of alternate transmission paths are interleaved with the alternate transmission paths making up the first subset of alternate transmission paths.

11. The communications bus of claim 7 wherein:
(a) the source node and each additional source node is associated with a respective receive node and first direction control node, and the destination node and each additional destination node is associated with a respective send node and second direction control node;
(b) a send switching arrangement is interposed between the send nodes and the alternate transmission paths;
(c) a receive switching arrangement is interposed between the alternate transmission paths and the receive nodes;
(d) a first direction control switching arrangement is interposed between the first direction control nodes and a control input of a number of tri-state drivers, each tri-state driver associated with a respective source node; and
(e) a second direction control switching arrangement is interposed between the second direction control nodes and a control input of a number of additional tri-state drivers, each additional tri-state driver associated with a respective send node.

12. A communications bus connected between a number of source nodes and an equal number of destination nodes where each respective source node is matched with a respective one of the destination nodes to form a respective matched pair of nodes, the communications bus including:
(a) for each respective matched pair of nodes, a number of alternate transmission paths extending between the respective source node and the respective matched one of the destination nodes included in the respective pair of nodes, the number of alternate transmission paths being formed on a common substrate comprising a semiconductor chip;
(b) a source switching arrangement, the source switching arrangement being interposed between each respective source node and the respective alternate transmission paths associated with that respective source node, the source switching arrangement also being operable to selectively connect each respective source node to a respective selected one of the alternate transmission paths associated with that source node and disconnect each respective source node from each other alternate transmission path associated with that source node;
(c) a destination switching arrangement, the destination switching arrangement being interposed between each respective destination node and the respective alternate transmission paths associated with that respective destination node, the destination switching arrangement also being operable to selectively connect each respective destination node to the respective selected one of the alternate transmission paths associated with that destination node and disconnect the respective destination node from each other alternate transmission path associated with that destination node;
(d) wherein each source node is associated with a respective receive node and first direction control node, and each destination node is associated with a respective send node and second direction control node;
(e) wherein a send switching arrangement is interposed between the send nodes and the alternate transmission paths;
(f) wherein a receive switching arrangement is interposed between the alternate transmission paths and the receive nodes;
(g) wherein a first direction control switching arrangement is interposed between the first direction control nodes and a respective control input of a number of tri-state drivers, each tri-state driver associated with a respective source node; and
(h) wherein a second direction control switching arrangement is interposed between the second direction control nodes and a respective control input of a number of additional tri-state drivers, each additional tri-state driver associated with a respective send node.

13. The communications bus of claim 12 wherein the source switching arrangement comprises a number of multiplexers.

14. The communications bus of claim 13 wherein the source nodes are arranged side-by-side and wherein at least one pair of adjacent source nodes in this side-by side arrangement share a common multiplexer included in the number of multiplexers.

15. The communications bus of claim 12 wherein:
(a) the source switching arrangement includes a first switching subset connected to a first subset of the alternate transmission paths;
(b) the source switching arrangement further includes a second switching subset connected to a second subset of the alternate transmission paths; and
(c) the alternate transmission paths making up the second subset of alternate transmission paths are interleaved with the alternate transmission paths making up the first subset of alternate transmission paths.

16. A method for compensating for errors in a communications bus between a source node and a destination node, the bus including alternate transmission paths between the source node and destination node on a common substrate, the method including the steps of:
(a) applying a test signal to a first one of the alternate transmission paths between the source node and the destination node;
(b) determining whether the test signal is properly received at the destination node; and
(c) if the test signal is not properly received at the destination node, switching to a second one of the alternate transmission paths between the source node and destination node.

17. The method of claim 16 further including the steps of:
(a) applying a second test signal to the second one of the alternate transmission paths between the source node and the destination node; and
(b) determining whether the second test signal is properly received at the destination node.

18. The method of claim 16 wherein the communications bus extends between a number of source nodes and a like number of destination nodes, and the bus includes a number of alternate transmission paths between each source node and a respective one of the destination nodes, and wherein the method further includes:
(a) applying a respective test signal to each alternate transmission path between each respective source node and its respective destination node;

(b) determining whether each respective test signal is properly received at the respective destination node; and (c) for each respective test signal that is not properly received at the respective destination node, switching the respective source node to a different one of the alternate transmission paths between the respective source node and destination node.

19. The method of claim 18 wherein the step of switching the respective source node to a different one of the alternate transmission paths between the respective source node and destination node includes applying a control signal to a switching device interposed between the source node and the alternate transmission paths associated with the respective source node.

20. The method of claim 19 wherein each control signal is applied from a memory device associated with the communications bus.

21. A communications bus connected between a source node and a destination node, the communications bus including:

(a) a number of alternate transmission paths extending between the source node and the destination node on a common substrate comprising a semiconductor chip;

(b) a source switching arrangement interposed between the source node and the alternate transmission paths, the source switching arrangement being operable to selectively connect the source node to a selected one of the alternate transmission paths and disconnect the source node from each other alternate transmission path;

(c) a destination switching arrangement interposed between the destination node and the alternate transmission paths, the destination switching arrangement being operable to selectively connect the destination node to the selected one of the alternate transmission paths and disconnect the destination node from each other alternate transmission path;

(d) test circuitry connected to the source node and destination node for applying a test signal to each alternate transmission path at initialization of the communication bus and for monitoring the destination node to determine whether the respective test signal is properly received at the destination node; and (e) wherein a receive node and first direction control node are associated with the source node, and a send node and second direction control node are associated with the destination node;

(f) a send switching arrangement is interposed between the send node and each alternate transmission path;

(g) a receive switching arrangement is interposed between each alternate transmission path and the receive node;

(h) a first direction control switching arrangement is interposed between the first direction control node and a control input of a tri-state driver associated with the source node; and (i) a second direction control switching arrangement is interposed between the second direction control node and a control input of a tri-state driver associated with the send node.

22. The communication bus of claim 21 wherein the test circuitry is configured to apply the test signal once only.

* * * * *